United States Patent
Marquardt et al.

(10) Patent No.: US 10,764,374 B1
(45) Date of Patent: Sep. 1, 2020

(54) INTERNET-OF-THINGS (IOT) DEVICE REFERENCE NETWORK

(71) Applicant: Sprint Communications Company L.P., Overland Park, KS (US)

(72) Inventors: Ronald R. Marquardt, Woodinville, WA (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/403,614

(22) Filed: May 6, 2019

(51) Int. Cl.
| | |
|---|---|
| H04L 12/26 | (2006.01) |
| H04L 29/08 | (2006.01) |
| H04W 4/70 | (2018.01) |
| H04L 9/32 | (2006.01) |
| H04B 3/54 | (2006.01) |
| G06Q 20/30 | (2012.01) |

(52) U.S. Cl.
CPC ......... *H04L 67/125* (2013.01); *G06Q 20/305* (2013.01); *H04B 3/542* (2013.01); *H04L 9/3236* (2013.01); *H04L 2209/38* (2013.01)

(58) Field of Classification Search
CPC . H04L 67/125; H04L 9/3236; H04L 2209/38; G06Q 20/305; H04B 3/542
See application file for complete search history.

(56) References Cited

U.S. PATENT DOCUMENTS

| | | | |
|---|---|---|---|
| 2018/0191592 A1* | 7/2018 | Lin | H04W 4/70 |
| 2019/0116058 A1* | 4/2019 | Kaliappan | H04L 67/125 |
| 2019/0387489 A1* | 12/2019 | Idnani | H04L 67/125 |

* cited by examiner

*Primary Examiner* — Soe Hlaing

(57) ABSTRACT

A method of operating a reference network comprising a plurality of Internet-of-things (IoT) devices. The method comprises monitoring reference activities of a plurality of IoT devices in a reference network by a first IoT device, wherein the monitoring comprises detecting events of reference rations being delivered to the IoT devices and detecting events of references being transmitted by the IoT devices, maintaining a reference ration account balance by the first IoT device for each of the IoT devices, determining by the first IoT device that a second IoT device transmits a reference while the reference ration account balance of the second IoT device is below a threshold value, and transmitting a report by the first IoT device, where the report identifies the second IoT device, identifies the reference transmitted by the second IoT device, and identifies the value of the reference ration account balance of the second IoT device.

20 Claims, 5 Drawing Sheets

INTERNET-OF-THINGS (IOT) DEVICE REFERENCE NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The Internet of things (IoT) refers to the trend towards providing communication networking to a wide variety of devices such as vehicles and appliances. An appliance may be coupled to an electronic communication module that communicatively couples the appliance to the Internet. The electronic communication module may collect sensor data and state data from the appliance and transmit it to the Internet. The electronic communication module may receive control commands from the Internet and provide them to the appliance. For example, an application on a smart phone may be used by a home owner to command the air conditioning thermostat to begin cooling the house down while the owner is waiting to collect his or her luggage at the airport after completing a business trip. As the IoT expands, new applications and new functionality are developed and deployed using the IoT as an infrastructure.

SUMMARY

In an embodiment, a method of establishing a reference network comprising a plurality of Internet-of-things (IoT) devices is disclosed. The method comprises initiating communication by a first IoT device with a plurality of IoT devices and transmitting reference participation requests by the first IoT device to some of the plurality of IoT devices, wherein the reference participation request authorizes an IoT device that consents to the request to monitor events generated by the first IoT device and to store information pertaining to the monitored events. The method further comprises receiving reference participation consents by the first IoT device from some of the plurality of IoT devices, wherein each reference participation consent indicates the associated IoT device consents to monitor events generated by the first IoT device and respond to requests for a reference on the first IoT device based on the monitored events. The method further comprises creating a block chain by the first IoT device, where the block chain is stored separately from the first IoT device and adding a block to the block chain by the first IoT device for each of the reference participation consents received from the plurality of IoT devices, wherein each added block identifies a communication address of the associated IoT device that has consented to respond to requests for the reference on the first IoT device, whereby a reference network comprising a plurality of IoT devices is established.

In another embodiment, a method of operating a reference network comprising a plurality of Internet-of-things (IoT) devices is disclosed. The method comprises receiving a reference participation request by a first IoT device from a second IoT device, where the reference participation request comprises an identity of the second IoT device and an authorization to monitor events generated by the second IoT device and to store information pertaining to the monitored events. The method further comprises detecting an event generated by the second IoT device by the first IoT device and storing a record by the first IoT device about the event generated by the second IoT device. The method further comprises receiving a first reference ration by the first IoT device and adding the first reference ration by the first IoT device to a reference ration account of the first IoT device. The method further comprises receiving a request by the first IoT device to provide a reference on the second IoT device, determining by the first IoT device that the reference ration account of the first IoT device has a value that exceeds a threshold value, generating a reference on the second IoT device by the first IoT device based on a plurality of records about events generated by the second IoT device, and transmitting the reference on the second IoT device by the first IoT device.

In yet another embodiment, a method of operating a reference network comprising a plurality of Internet-of-things (IoT) devices is disclosed. The method comprises monitoring reference activities of a plurality of IoT devices in a reference network by a first IoT device, wherein the monitoring comprises detecting events of reference rations being delivered to the IoT devices in the reference network and detecting events of references being transmitted by the IoT devices. The method further comprises, based on monitoring the reference activities of the IoT devices in the reference network, maintaining a reference ration account balance by the first IoT device for each of the IoT devices in the reference network and, based on monitoring the reference activities of a second IoT device in the reference network, determining by the first IoT device that the second IoT device transmits a reference while the reference ration account balance of the second IoT device is below a threshold value. The method further comprises transmitting a report by the first IoT device, where the report identifies the second IoT device, identifies the reference transmitted by the second IoT device, and identifies the value of the reference ration account balance of the second IoT device at the time the second IoT device transmitted the reference.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
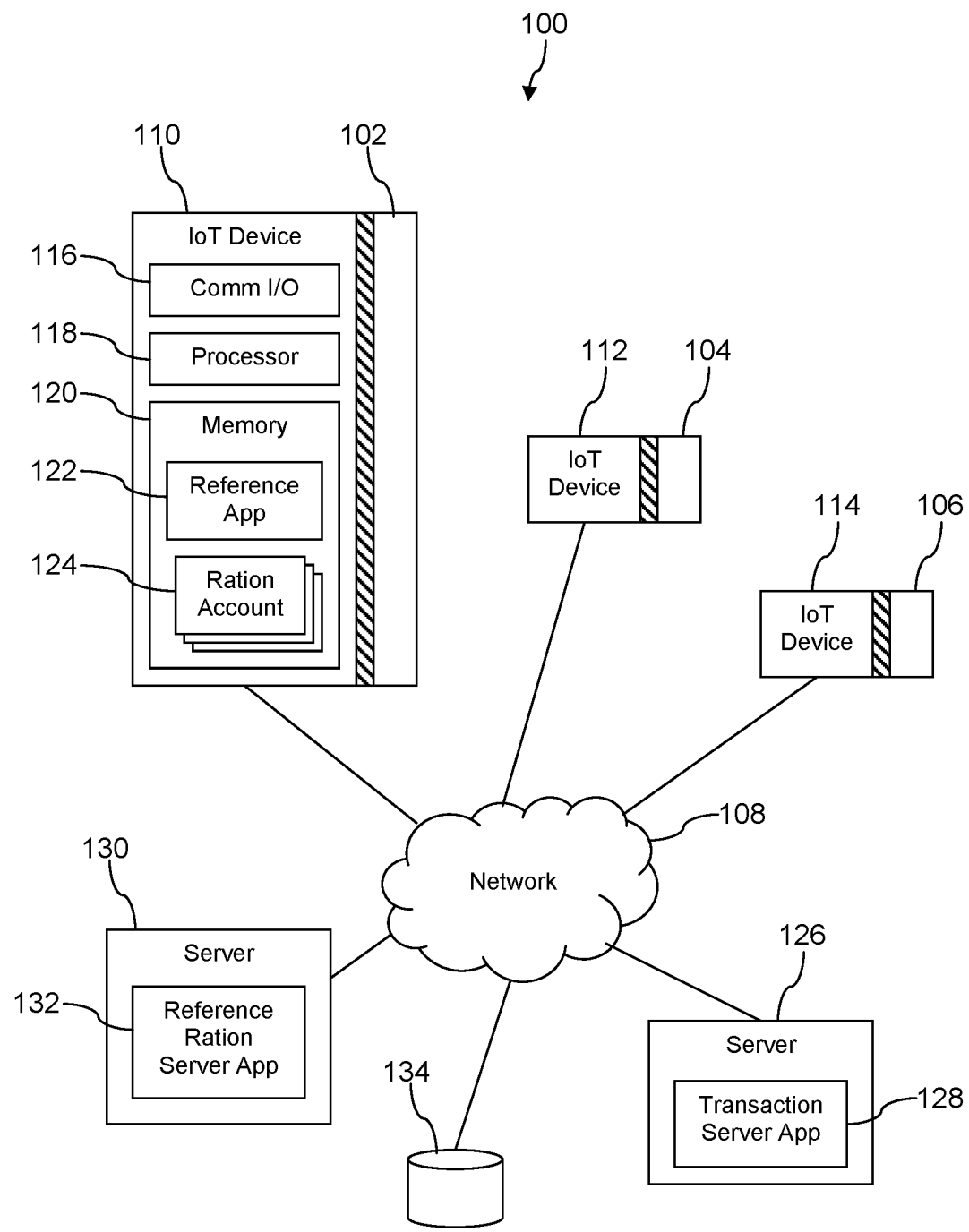
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Internet of things (IoT) devices are proliferating. These devices may be enabled to invoke requests for services and transactions at a variety of different levels of sensitivity. For example, a first level of sensitivity may be associated with providing a report on a sensor value, for example a current temperature of an interior. A second level of sensitivity may be associated with completing a financial transaction, for example automatically making a purchase via a credit card. For example, a refrigerator appliance may be embedded in an IoT communication device that monitors stocks of fundamental food items like milk, butter, eggs, and coffee and may automatically order these items from a grocery store and pay for the purchase with a credit card associated with the owner of a house in which the refrigerator is installed.

A challenge for extending the functionality of IoT is assuring security. The present disclosure teaches a system for establishing a reference network among a plurality of IoT devices that provides references on an IoT device that may seek to complete a sensitive transaction. Such references can reduce the risk posed by an IoT device attempting to complete a fraudulent transaction, for example an act of identity theft by making an unauthorized charge to a credit card or credit account. For example, if the IoT device is attempting identity theft, it may lack references or be associated only with poor references, and the transaction can be denied in view of the lack of positive references.

The present disclosure teaches an IoT device (e.g., an electronic component that is configured to communicate with the Internet and that is embedded in an appliance) that discovers other IoT devices and requests them to monitor its behavior, to store a history of their observations of its behavior, and to respond for requests to references on the IoT device. For example, an IoT device embedded in a refrigerator is purchased by a home owner and installed in her home. She programs the refrigerator to monitor stocks of milk, coffee, and eggs and to automatically order and pay for restocking of these items from a local grocery store that supports such automated shopping. An IoT device embedded in this refrigerator detects the presence of other IoT devices that communicate via the Internet. These other IoT devices may be embedded in other refrigerators. These other IoT devices may be embedded in other appliances, for example in a washer or dryer, in a television, or in a heating and air conditioning controller. The IoT device in the refrigerator sends a request message to the IoT devices asking them to monitor its activities, to build a history of its activities, and to respond to requests for a recommendation on the IoT device based on their accumulated history. The other IoT devices monitor messages transmitted by the IoT device embedded in the refrigerator, for example replies to inquiries from the owner about stocks of other items in the refrigerator, for example grocery purchase requests.

The histories maintained by the other IoT devices may record amounts of purchase transactions and the name of the grocery store. The histories maintained by the IoT devices may record a physical address indicated for delivery of a good or service associated with purchase transactions. The histories maintained by the IoT devices may record information regarding the proximity to the monitored IoT device, for example an indication that the monitored IoT device is on the same local area network (LAN) as the monitoring IoT device. When the refrigerator attempts to complete a purchase transaction from a different grocery store for the first time, the automated order system of that grocery store may request a reference on the IoT device embedded in the refrigerator. The several IoT devices that are monitoring the IoT device embedded in the refrigerator report a history of modest purchases of specific grocery products. The automated order system requesting the reference analyzes the reports from the several IoT devices monitoring the IoT device embedded in the refrigerator and deems that the order from the IoT device embedded in the refrigerator is probably legitimate and completes the transaction, billing the modest purchase to the credit card identified by the IoT device in the refrigerator.

The automated order system can analyze the reports in various ways, taking into account the dollar amounts of transactions initiated by the refrigerator IoT device, the goods or services purchased in the transactions, the frequency of transactions, the delivery address for a good or service associated with the transactions, the communication address of the refrigerator IoT device. In some cases, a change in either dollar amounts of transactions or a frequency of transactions initiated by a IoT device may be taken into consideration in evaluating whether to allow the requested transaction or to deny it. As an example, if an IoT device embedded in a refrigerator has a history of requesting transactions about once per week changes to requesting transactions three times per day, this may trigger a transaction rejection by the automated order system. When transaction requests are denied, the automated order system may send a notification to a human being associated with the IoT device, for example an owner of a home where the refrigerator IoT is located.

If the address provided for delivery of the good or service changes, the automated order system may reject the transaction request and send notification to a human being associated with the IoT device. If the proximity of the IoT device to the monitoring IoT devices changes (e.g., if the media access control (MAC) address of the monitored IoT device changes or if the monitored IoT device is not on the same LAN as formerly, the automated order system may reject the transaction request and send notification to a human being associated with the IoT device.

Alternatively, in an embodiment, each monitoring IoT devices may analyze the history of refrigerator IoT device transactions that it has created and generate a summary statement of trustworthiness of the refrigerator IoT device. This summary statement may be a trustworthiness score, for example a score of 0 to 10 or 1 to 10 or some other numerical score. The automated order system, in this embodiment, may average trustworthiness scores received from a plurality of monitoring IoT devices and compare the average trustworthiness score to a threshold. In an embodiment, the threshold employed by the automated order system may vary based on the dollar amount of the transaction involved. For example, a low dollar transaction may be associated with a moderate level of trustworthiness threshold (e.g., a 5 on a scale of 0 to 10 where 0 is untrusted and 10 is fully trusted) and a high dollar transaction may be associated with a high level of trustworthiness threshold (e.g., a 9 on the same scale).

Alternatively, when the refrigerator IoT device attempts to complete a purchase of ten $100 gift cards for a specialty coffee shop, the difference between both the cost of the purchase and the type of goods purchased relative to the history of previous purchases (modest dollar amount purchases of common grocery items) provided in references from the monitoring IoT devices may be deemed indicative of attempted fraud by the refrigerator IoT device. In this case, for example, the refrigerator IoT device may have been hacked and may be being used as a portal to commit identity theft.

In an embodiment, when an IoT device has been requested to monitor another IoT device (e.g., an IoT device in the stove has been requested to monitor the IoT device in the refrigerator), it may send a consent message back to the requesting IoT device indicating it consents to monitor events generated by the requesting IoT device and to respond to requests from a different device (e.g., a server computer associated with a grocery store) for a reference on the requesting IoT device. The consent message may comprise a communication address such as a telephone number, IP address, or other unique label by which the consenting IoT device can be contacted. The IoT device that requested the monitoring may create a block that identifies the consenting IoT device and that comprises the communication address of the consenting IoT device. The block chain is associated to the IoT device being monitored and may comprise a plurality of blocks each identifying an IoT device that has consented to monitor it and provide references on it. An authorized entity (e.g., a server computer associated with a grocery store) may read from the block chain to learn of the IoT devices that have consented to monitor the subject IoT device and to learn their communication addresses. The authorized entity can then communicate with those consenting IoT devices to obtain their references on the subject IoT device, for example a history of the activities of the subject IoT device that have been observed by the consenting IoT device. The history of activities of a monitored IoT device collected by a consenting IoT device may include information on dollar amounts of purchases, identity of goods purchased, a category of goods purchased (e.g., grocery goods category, a premium communication monthly service fees category, an office supplies category, an HVAC periodic maintenance service call category, etc.), a volume of data traffic originated and/or received by the monitored IoT device, IP addresses of devices the monitored IoT device communicates with, and other information.

It may be desirable to distribute requests for references or reports from IoT devices in such a way as to avoid an IoT device becoming overloaded with such requests. Alternatively, it may be desirable to distribute requests for references from IoT devices in accord with a capability of each IoT device to handle its own load (e.g., some IoT devices may be capable of sustaining a higher rate of recommendation requests than others). Additionally, it may be desirable to avoid the possibility that some IoT device becomes the "go to" monitor for getting an easy reference or by contrast a tough reference. The present disclosure contemplates using a ration value being distributed to IoT devices to modulate the reference activities they participate in. By providing rations in increments to IoT devices, a central server can control how many reference requests an IoT device processes and how often it processes reference requests.

In an embodiment, an IoT device that has consented to monitor other IoT devices may be configured with a ration value that is decremented when the IoT device provides a reference on one of those other IoT devices it is monitoring. The ration value may be maintained by incrementing or decrementing the ration account maintained by the IoT device. An authorized ration management server may perform this incrementing and decrementing of the ration account of the IoT device. The monitoring IoT device checks its ration value when receiving a request to provide a reference on an IoT device it is monitoring, and if the ration value is less than a threshold value (e.g., less than a zero value), the monitoring IoT device sends a reference rejection to the requesting entity. The reference rejection may identify insufficient ration as a reason for the rejection. A ration balance system as described may be used for a variety of purposes, including to assure that references are distributed equitably among a plurality of monitoring IoT devices.

In an embodiment, an IoT device may monitor the ration accounts maintained by its peer IoT devices. If an IoT device determines that another IoT device provides a reference on a subject IoT device when the ration account of that other IoT device is less than the predefined ration threshold, the IoT device reports this improper behavior to a ration monitoring entity, such as the authorized ration management server. The ration monitoring entity may take action to sanction the IoT device that has improperly provided a reference when its ration account was below the predefined threshold. Alternatively, the ration monitoring entity may create a trouble ticket that indicates that the IoT device may have been hacked and should be scanned and purged of any malware.

The IoT reference system described herein may provide the benefits both of increased efficiency and increased security relative to customary techniques. Because the monitoring function is distributed to the edge of the communication network, subverting this function by malware is made more difficult. Malware might subvert the monitoring function on some of the IoT monitoring devices, but this would be a localized problem and not a system-wide problem. Because the monitoring is performed remotely and the histories of transactions of monitored IoT devices stored remotely, this reduces the storage burden as well as reducing the processing burden in the core network or at automated order systems. In some sense this reduction of processing burden on the core network or automated order systems comes "for free," because it does not inherently entail extra burden on the IoT devices. The processing load for an individual IoT device for participating in the reference system is expected to be trivial. Additionally, the use of a ration in some embodiments can accommodate differences in processing capacities of different IoT devices to avoid any IoT device being over burdened with reference processing.

Turning now to FIG. 1, a system 100 is described. In an embodiment, the system 100 comprises a first appliance 102, a second appliance 104, a third appliance 106, and a network 108. The first appliance 102 is coupled to a first IoT device 110, the second appliance 104 is coupled to a second IoT device 112, and the third appliance 106 is coupled to a third IoT device 114. The first IoT device 110 may be said to be embedded in the first appliance 102, the second IoT device 112 may be said to be embedded in the second appliance 104, and the third IoT device 114 may be said to be embedded in the third appliance 106. An IoT device that is embedded in an appliance may be able to sense and/or monitor events or states of the appliance. An IoT device that is embedded in an appliance may be able to provide control signals to the appliance. The appliances 102, 104, 106 may be any appliance such as a refrigerator, an oven, a stove, a microwave oven, a coffee pot, a clothes washer, a clothes dryer, a water heater, a freezer, a television, a heating ventilation and air conditioning (HVAC) system, or another appliance.

In an embodiment, the appliances 102, 104, 106 may be the same type of appliance. In another embodiment, the appliances 102, 104, 106 may not be the same type of appliance. For example, the first appliance 102 may be a refrigerator, the second appliance 104 may be a stove, and the third appliance 106 may be a television. The appliances 102, 104, 106 may be located in the same building or may be located in different buildings.

The IoT devices 110, 112, 114 are communicatively linked to the network 108. The IoT device 110, 112, 114 may communicate to the network 108 by a wireless communication link or by a wired link. In an embodiment, the IoT device 110, 112, 114 may communicate with the network 108 via a cellular wireless link, a WiFi wireless link, or a Bluetooth® wireless link. In an embodiment, the IoT device 110, 112, 114 may communicate with the network 108 via a coaxial cable link. In an embodiment, the IoT device 110, 112, 114 may communicate with the network 108 by a power line communication (PLC) link. In an embodiment, the IoT devices 110, 112, 114 may communicate with the network 108 using different communication links. For example, in an embodiment, the first IoT device 110 may communicate with the network 108 using a cellular wireless link to a cell site and a wired link from the cell site to the network 108; the second IoT device 112 may communicate with the network 108 using a WiFi wireless link to a WiFi access point (AP) and a wired link from the WiFi AP to the network 108; and the third IoT device 114 may communicate with the network 108 using a PLC link to a PLC gateway and a wired link from the PLC gateway to the network 108. The network 108 comprises one or more private networks, one or more public networks, or a combination thereof. While three appliances 102, 104, 106 and three IoT devices 110, 112, 114 are illustrated in FIG. 1, system 100 may comprise any number of appliances and any number of IoT devices.

The first IoT device 110 comprises a communication input/output (I/O) device 116, a processor 118, and a memory 120. The memory 120 may store a reference application 122 and one or more ration accounts 124. The reference application 122 and the ration accounts 124 may be stored in a non-transitory portion of the memory 120. The communication I/O device 116 provides communication connectivity to the network 108. The communication I/O device 116 may provide communication to the first appliance 102. The communication I/O device 116 may receive input from sensors located in the first appliance 102, for example input from a temperature sensor. The communication I/O device 116 may receive input from the first appliance 102 indicating state, for example an indication indicating an open or closed state or an indication of a control position. The communication I/O device 116 may send a control output to the first appliance 102. The processor 118 may execute various applications and/or scripts to interact with the first appliance 102. The processor 118 executes a reference application 122. The reference application 122 may promote requesting other IoT devices to monitor its activities as well as promote replying to requests to monitor other IoT devices. The ration accounts 124 may comprise locations in the memory 120 or registers in the memory 120 that each maintains a ration value associated with a different IoT device. One of the ration accounts 124 stores a ration value associated with the first IoT device 102. The other ration accounts 124 may store ration values associated with other IoT devices which the reference application 122 has consented to monitor and provide references for. The second IoT device 112 and the third IoT device 114 are structured similarly to the first IoT device 114 and each comprises a communication I/O device 116, a processor 118, and a memory 120 that stores a reference application 122 and one or more ration accounts 124.

In an embodiment, the first IoT device 110 may communicate via the network 108 to a transaction server 126 that executes a transaction server application 128. The transaction server 126 may be implemented as a computer system. Computer systems are described further hereinafter. The first IoT device 110 may initiate a transaction to be completed by the transaction server application 128. In an example, the transaction server 126 may be maintained by a grocery store, and the first IoT device 110 may initiate a grocery purchase transaction via an application programming interface (API) of the transaction server application 128. For example, the first IoT device 110 may purchase a gallon of milk, a dozen eggs, a package of coffee, and arrange for these articles to be ready for pick-up at a pick-up drive through lane at the grocery store at 5:40 PM. This transaction may involve charging the costs for the articles to a credit card. This is one example transaction that an IoT device 110, 112, 114 may initiate, but other transactions are contemplated by the present disclosure. As illustrated by the grocery purchase and credit card charging example here, IoT devices 110, 112, 114 may initiate transactions that may be considered sensitive or confidential in various ways, for example by spending money, by revealing information, or in other ways.

The transaction server application 128 may wish to screen transactions initiated by IoT devices to reduce its exposure to fraud. The transaction server application 128 may request a recommendation or recommendations on the first IoT device 110 from the IoT devices 112, 114. When the first IoT device 110 initiates the transaction, it may provide the transaction server application 128 an address or reference to the block chain stored in the data store 134 that identifies the IoT devices 112, 114 that have consented to monitor and provide references on the first IoT device 110 and that includes the contact addresses (e.g., IP addresses) of the IoT devices 112, 114. The transaction server application 128 can communicate with each of the second IoT device 112 and the third IoT device 114 to request a recommendation from each of them on the first IoT device 110. The second IoT device 112 and the third IoT device 114 may provide all of the history they have collected on the first IoT device 110 to the transaction server application 128. Alternatively, the second IoT device 112 and the third IoT device 114 may process the history they have collected on the first IoT device 110, generate a summary of that history, and return the summary to the transaction server application 128. The summary may comprise summed up values of transactions, average values of transactions, a list of goods transacted, etc.

The transaction server application 128 may then analyze the references provided on the first IoT device 110 to determine a trustworthiness of the first IoT device 110 and/or to determine if it wishes to allow the completion of the transaction initiated by the first IoT device 110. In an embodiment, the transaction server application 128 may calculate a trustworthiness metric on the first IoT device 110 and store this metric in the data store 134. In an embodiment, other transaction server applications may prefer to rely on one or more previously calculated and stored trustworthiness metrics they read from the data store 134 rather than pulling and analyzing references from the IoT devices. The trustworthiness metrics stored in the data store 134 may be time stamped, and a transaction server application may use a trustworthiness metric in lieu of pulling and analyzing references from the IoT devices 112, 114 when the trustworthiness metric is fresh (e.g., if the time stamp associated with the trustworthiness metric is not very old). If the trustworthiness metric is stale, the transaction server application may instead choose to pull and analyze references from the IoT devices 112, 114.

An IoT device may discover or detect other IoT devices whose communications it can receive. The IoT device may send a request to the other IoT devices to monitor its activities and to provide a reference on the IoT device upon request from another entity, for example from the reference ration server application 132. If the one or more IoT devices consent to monitor and provide references, the IoT device may initialize a block chain and store it in the data store 134 or another data store and add blocks to the block chain, where each block captures the identity and the contact information of one of the IoT devices that has consented to monitor its activities. The monitoring information that an IoT device may capture and store on another IoT device that it is monitoring may be information about the communication traffic volume the monitored IoT device generates, the number of purchase transactions the monitored IoT device completes, the dollar average of purchase transactions the monitored IoT device completes, the high dollar purchase transaction of the monitored IoT device, and other information. The information may include addresses of other devices that the monitored IoT device communicates with.

When asked to provide a reference, the monitoring IoT device may provide all the information it has collected on the monitored IoT device. Alternatively, the monitoring IoT device may instead provide some summary information on the monitored IoT device that if produces based on processing the information it has collected and stored locally. When the IoT devices 110, 112, 114 discover each other and consent to monitor each other and to provide references on each other, the IoT devices 110, 112, 114 may be said to establish an IoT reference network.

In an embodiment, the reference ration server application 132 provides rations to the IoT devices 110, 112, 114 that restrict the frequency with which they may provide references. Before providing a requested reference, the IoT device 110, 112, 114 would check their ration account 124 and see if the ration was above a predefined threshold value—for example greater than zero. If their ration account 124 had a value above the predefined threshold, they would decrement the ration account 124 value by a predefined decrement value, create the requested reference, and return the requested reference. If the value was not above that predefined threshold, the IoT device 110, 112, 114 may return a reference rejection message. In an embodiment, the reference rejection message may contain a reason such as insufficient ration.

The use of rations in this way may promote distributing reference requests equitably among IoT devices 110, 112, 114. While only three IoT devices 110, 112, 114 have been described for succinctness, the system 100 may comprise a much larger number of IoT devices. The first IoT device 110 may discover many more IoT devices and request that many of them monitor its activities and stand ready to provide references on it. In this case, a transaction server application 128 may prefer to choose a selection of these monitoring IoT devices for requesting references from. By providing rations to IoT devices 110, 112, 114 and decrementing those rations when they provide references, the system 100 can encourage somewhat equal distribution of reference requests among the IoT devices.

In an embodiment, the system 100 further comprises a reference ration server 130 that executes a reference ration server application 132. The reference ration server may be implemented as a computer system. Computer systems are described further hereinafter. The reference ration server application 132 monitors ration accounts 124 of IoT devices 110, 112, 114 and occasionally sends ration increments to the IoT devices 110, 112, 114. In an embodiment, the IoT devices 110, 112, 114 send updates on the status of their ration accounts 124 to the reference ration server application 132. The reference ration server application 132 may withhold a ration increment from the first IoT device 110 if its ration account 124 is depleted well before the other IoT devices 112, 114.

Figure 2:
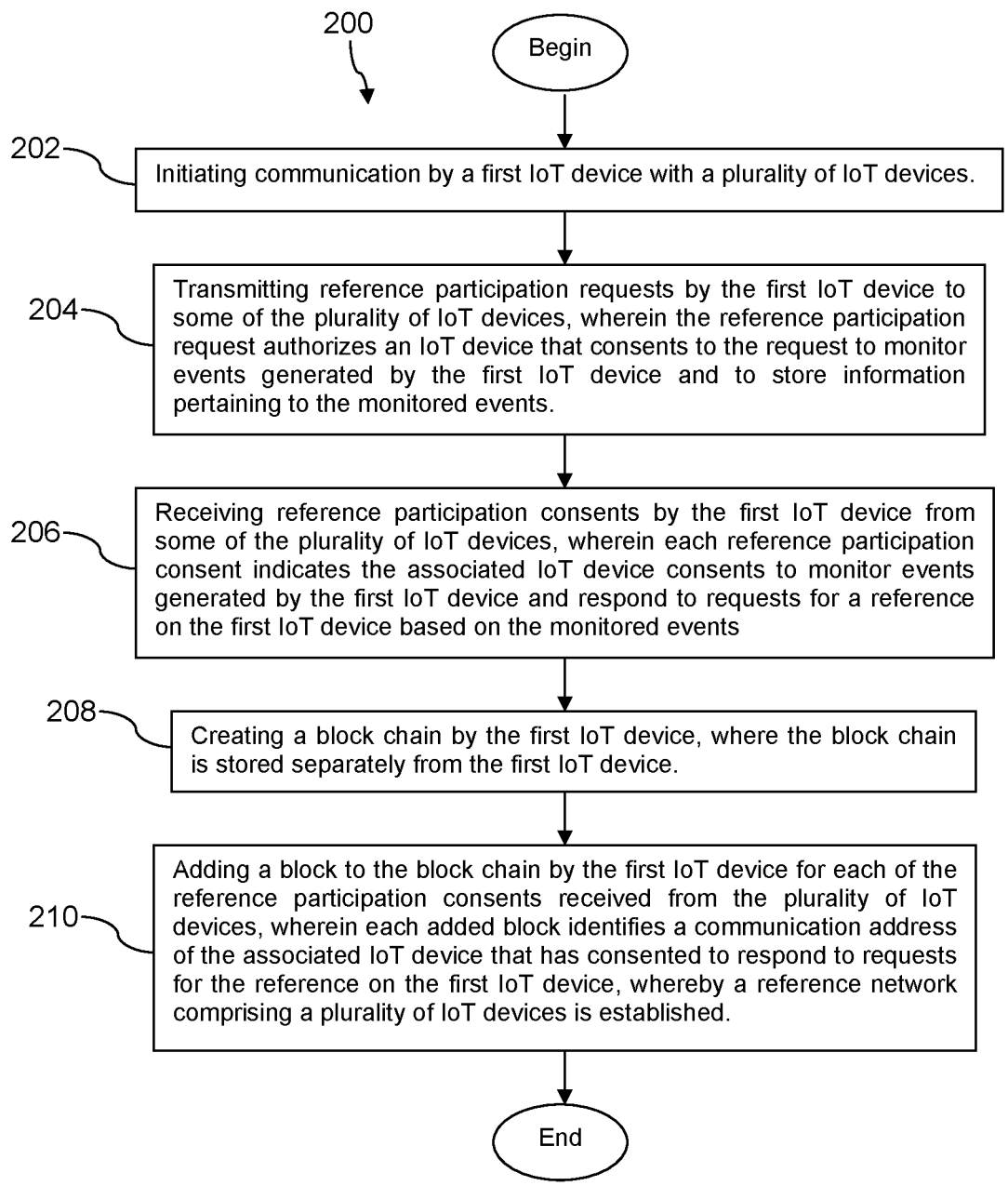
FIG. 2 is a flow chart of a method according to an embodiment of the disclosure.

Turning now to FIG. 2, a method 200 is described. In an embodiment, the method 200 is a method of establishing a reference network comprising a plurality of Internet-of-things (IoT) devices. At block 202, the method 200 comprises initiating communication by a first IoT device with a plurality of IoT devices. The processing of block 202 may comprise discovering the plurality of IoT devices by the first IoT device.

At block 204, the method 200 comprises transmitting reference participation requests by the first IoT device to some of the plurality of IoT devices, wherein the reference participation request authorizes an IoT device that consents to the request to monitor events generated by the first IoT device and to store information pertaining to the monitored events. At block 206, the method 200 comprises receiving reference participation consents by the first IoT device from some of the plurality of IoT devices, wherein each reference participation consent indicates the associated IoT device consents to monitor events generated by the first IoT device and respond to requests for a reference on the first IoT device based on the monitored events.

At block 208, the method 200 comprises creating a block chain by the first IoT device, where the block chain is stored separately from the first IoT device. The block chain may be stored in a data store, for example, in the data store 134. The block chain may be accessible by a plurality of transaction servers, for example by the transaction server 126. At block 210, the method 200 comprises adding a block to the block chain by the first IoT device for each of the reference participation consents received from the plurality of IoT devices, wherein each added block identifies a communication address of the associated IoT device that has consented to respond to requests for the reference on the first IoT device, whereby a reference network comprising a plurality of IoT devices is established.

Figure 3:
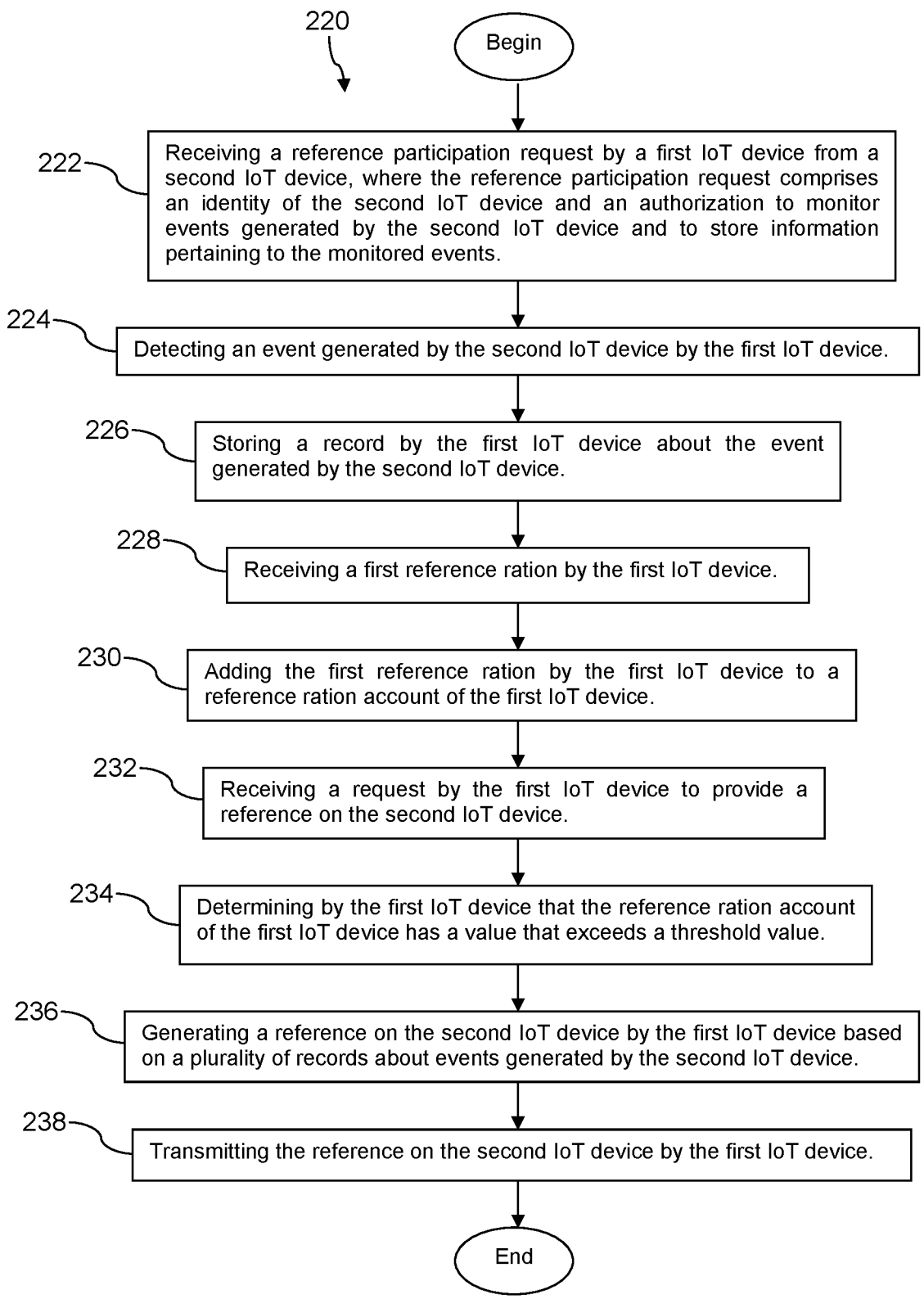
FIG. 3 is a flow chart of another method according to an embodiment of the disclosure.

Turning now to FIG. 3, a method 220 is described. In an embodiment, the method 220 comprises a method of operating a reference network comprising a plurality of Internet-of-things (IoT) devices. At block 222, the method 220 comprises receiving a reference participation request by a first IoT device from a second IoT device, where the reference participation request comprises an identity of the second IoT device and an authorization to monitor events generated by the second IoT device and to store information pertaining to the monitored events. The first IoT device may monitor the second IoT device by detecting electronic messages transmitted and received by the second IoT device, for example by listening in on a local area network (LAN) or listening in on a power line (e.g., using PLC communication techniques) or listening in on a wireless signal.

At block 224, the method 220 comprises detecting an event generated by the second IoT device by the first IoT device. At block 226, the method 220 comprises storing a record by the first IoT device about the event generated by the second IoT device. At block 228, the method 220 comprises receiving a first reference ration by the first IoT device. In an embodiment, the reference ration may be an integer value. At block 230, the method 220 comprises adding the first reference ration by the first IoT device to a reference ration account of the first IoT device.

At block 232, the method 220 comprises receiving a request by the first IoT device to provide a reference on the second IoT device. At block 234, the method 230 comprises determining by the first IoT device that the reference ration account of the first IoT device has a value that exceeds a threshold value, for example determining that the reference ration account holds a value greater than zero.

At block 236, the method 220 comprises generating a reference on the second IoT device by the first IoT device based on a plurality of records about events generated by the second IoT device. At block 238, the method 220 comprises transmitting the reference on the second IoT device by the first IoT device. In an embodiment, the processing of block 236 and/or block 238 may further comprise decrementing the reference ration account value of the first IoT device, for example subtracting an integer value of one from the integer value of the reference ration account of the first IoT device.

Figure 4:
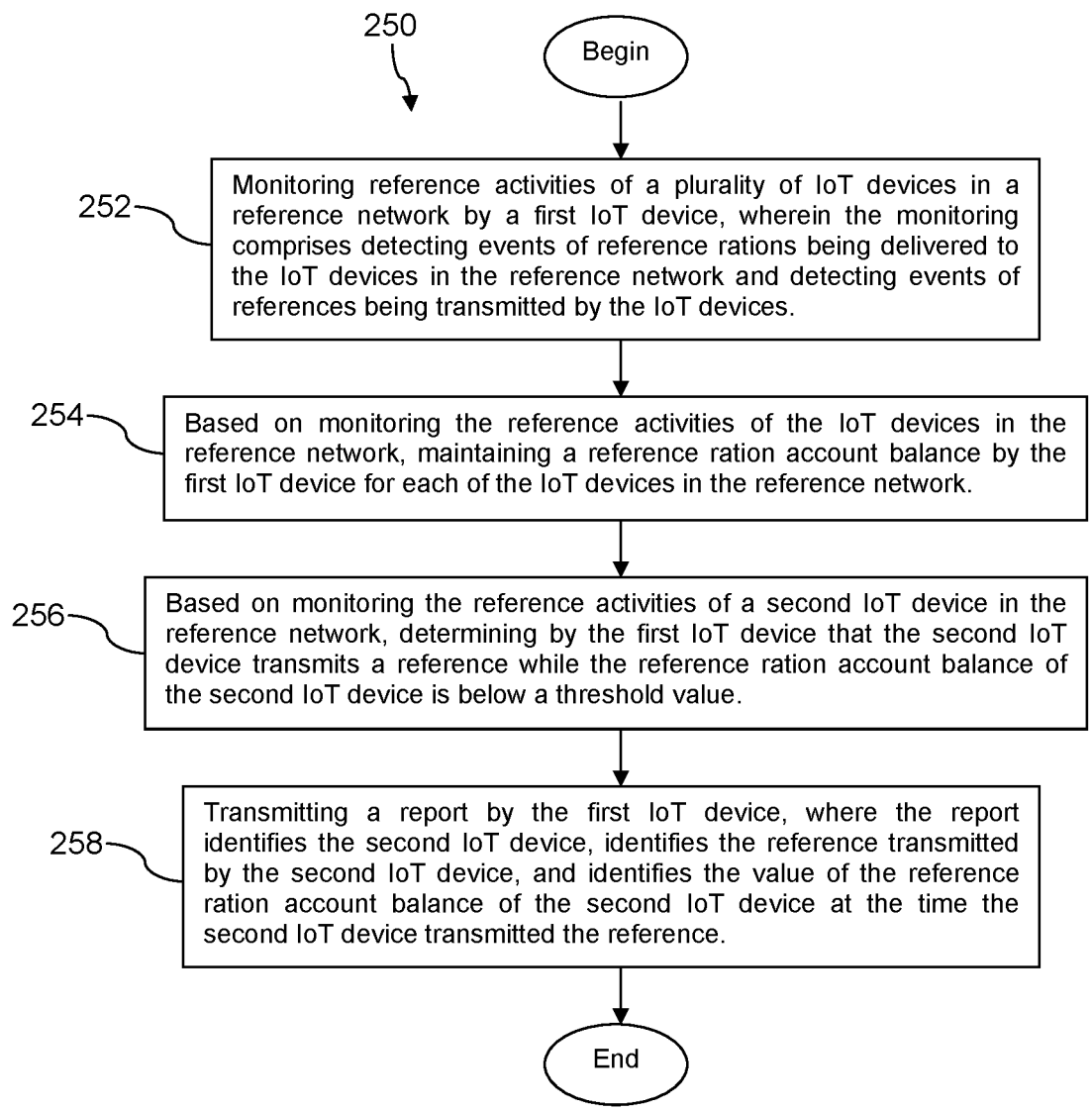
FIG. 4 is a flow chart of yet another method according to an embodiment of the disclosure.

Turning now to FIG. 4, a method 250 is described. In an embodiment, the method 250 comprises a method of operating a reference network comprising a plurality of Internet-of-things (IoT) devices. At block 252, the method 250 comprises monitoring reference activities of a plurality of IoT devices in a reference network by a first IoT device, wherein the monitoring comprises detecting events of reference rations being delivered to the IoT devices in the reference network and detecting events of references being transmitted by the IoT devices. At block 254, the method 250 comprises, based on monitoring the reference activities of the IoT devices in the reference network, maintaining a reference ration account balance by the first IoT device for each of the IoT devices in the reference network. The processing of block 254 may include incrementing the reference ration account balance associated with the other IoT devices when the reference ration server application 132 sends ration increments to the IoT devices and decrementing the reference account balance associated with the other IoT devices when they are observed by the first IoT device to have transmitted a reference.

At block 256, the method 250 comprises, based on monitoring the reference activities of a second IoT device in the reference network, determining by the first IoT device that the second IoT device transmits a reference while the reference ration account balance of the second IoT device is below a threshold value. At block 258, the method 250 comprises transmitting a report by the first IoT device, where the report identifies the second IoT device, identifies the reference transmitted by the second IoT device, and identifies the value of the reference ration account balance of the second IoT device at the time the second IoT device transmitted the reference. In an embodiment, the first IoT device transmits the report to the reference ration server application 132, and the reference ration server application 132 may take action based on the report. For example, the reference ration server application 132 may sanction the subject IoT device that has violated the restriction against providing references when its ration account is below the threshold amount. For example, the reference ration server application 132 generates a trouble ticket identifying the subject IoT device and describing its improperly providing a reference. In an embodiment, a malware scan may be performed on the subject IoT device and any discovered malware expunged from the subject IoT device.

Figure 5:
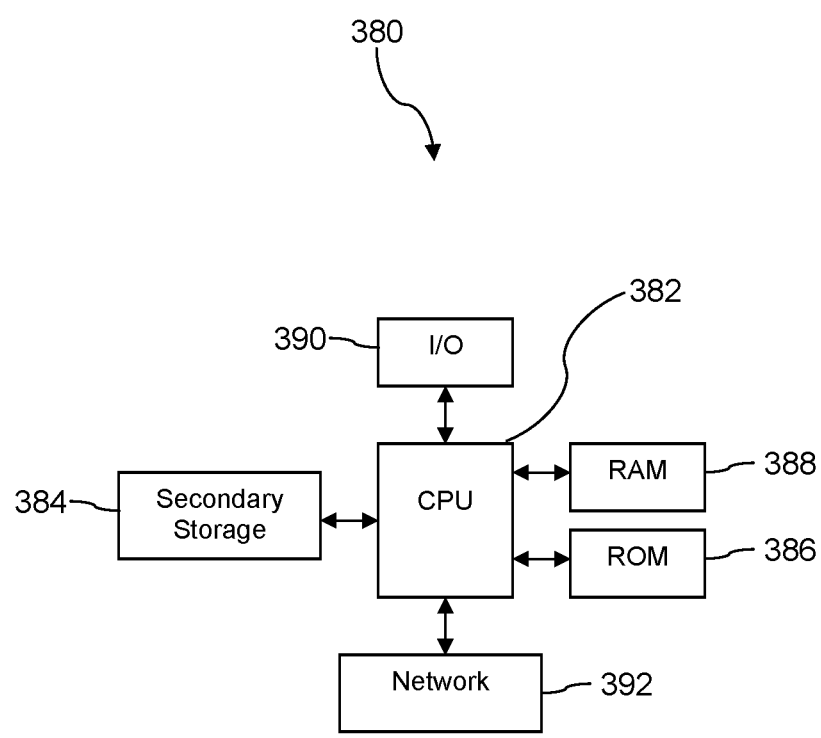
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of establishing a reference network comprising a plurality of Internet-of-things (IoT) devices, comprising:
    initiating communication by a first IoT device with a plurality of IoT devices;
    transmitting reference participation requests by the first IoT device to some of the plurality of IoT devices, wherein the reference participation request authorizes an IoT device that consents to the request to monitor events generated by the first IoT device and to store information pertaining to the monitored events;
    receiving reference participation consents by the first IoT device from some of the plurality of IoT devices, wherein each reference participation consent indicates an associated IoT device consents to monitor events generated by the first IoT device and respond to requests for a reference on the first IoT device based on the monitored events;
    creating a block chain by the first IoT device, where the block chain is stored separately from the first IoT device; and
    adding a block to the block chain by the first IoT device for each of the reference participation consents received from the plurality of IoT devices, wherein each added block identifies a communication address of the associated IoT device that has consented to respond to requests for the reference on the first IoT device, whereby a reference network comprising a plurality of IoT devices is established.

2. The method of claim 1, wherein the IoT devices are communicatively coupled to an Internet.

3. The method of claim 1, wherein each of the IoT devices is embedded in an appliance.

4. The method of claim 1, wherein the IoT devices are embedded in one of a refrigerator, a stove, an oven, a coffee maker, a microwave oven, a television, a clothes washer, or a clothes dryer.

5. The method of claim 1, wherein the first IoT device is configured to initiate a financial transaction.

6. The method of claim 1, wherein at least one of the IoT devices communicates to an Internet via a wireless communication link.

7. The method of claim 1, wherein at least one of the IoT devices communicates to an Internet via a power line communication (PLC) communication link.

8. A method of operating a reference network comprising a plurality of Internet-of-things (IoT) devices, comprising:
    receiving a reference participation request by a first IoT device from a second IoT device, where the reference participation request comprises an identity of the second IoT device and an authorization to monitor events generated by the second IoT device and to store information pertaining to the monitored events;
    detecting an event generated by the second IoT device by the first IoT device;
    storing a record by the first IoT device about the event generated by the second IoT device;
    receiving a first reference ration by the first IoT device;
    adding the first reference ration by the first IoT device to a reference ration account of the first IoT device;
    receiving a request by the first IoT device to provide a reference on the second IoT device;
    determining by the first IoT device that the reference ration account of the first IoT device has a value that exceeds a threshold value;
    generating a reference on the second IoT device by the first IoT device based on a plurality of records about events generated by the second IoT device; and
    transmitting the reference on the second IoT device by the first IoT device.

9. The method of claim 8, wherein the reference ration account stores integer values and the threshold value is zero.

10. The method of claim 9, further comprising decrementing the value of the reference ration account of the first IoT device by one.

11. The method of claim 8, further comprising:
    receiving a second request by the first IoT device to provide a reference on a third IoT device;
    determining by the first IoT device that the reference ration account of the first IoT device has a value that does not exceed the threshold value; and
    transmitting a reference rejection message, wherein the reference rejection message indicates a rejection reason of insufficient reference account value.

12. The method of claim 8, wherein the event detected by the first IoT device is a payment transaction and the record about the event comprises an identity of the second IoT device, a payment amount, and a product category.

13. The method of claim 8, wherein the event detected by the first IoT device is a request to provide a reference addressed to the second IoT device.

14. The method of claim 13, further comprising detecting a second event generated by the second IoT device by the first IoT device, wherein the second event is a transmission of a reference message comprising a current reference ration account value of the second IoT device; and storing a second record by the first IoT device about the second event, wherein the second record identifies the reference ration account value of the second IoT device.

15. A method of operating a reference network comprising a plurality of Internet-of-things (IoT) devices, comprising:
- monitoring reference activities of a plurality of IoT devices in a reference network by a first IoT device, wherein the monitoring comprises detecting events of reference rations being delivered to the IoT devices in the reference network and detecting events of references being transmitted by the IoT devices;
- based on monitoring the reference activities of the IoT devices in the reference network, maintaining a reference ration account balance by the first IoT device for each of the IoT devices in the reference network;
- based on monitoring the reference activities of a second IoT device in the reference network, determining by the first IoT device that the second IoT device transmits a reference while the reference ration account balance of the second IoT device is below a threshold value; and
- transmitting a report by the first IoT device, where the report identifies the second IoT device, identifies the reference transmitted by the second IoT device, and identifies the value of the reference ration account balance of the second IoT device at the time the second IoT device transmitted the reference.

16. The method of claim 15, further comprising:
- detecting a first event generated by the second IoT device by the first IoT device, wherein the second event is a transmission of a reference message comprising a current reference ration account value of the second IoT device; and
- updating a current reference ration account balance associated with the second IoT device by the first IoT device based on the current reference ration account value of the second IoT device in the reference message.

17. The method of claim 16,
- detecting a second event generated by the second IoT device by the first IoT device, wherein the second event is receiving a reference ration account increment; and
- updating the current reference ration account balance associated with the second IoT device by the first IoT device based on the reference ration account increment.

18. The method of claim 15, wherein the IoT devices are communicatively coupled to an Internet.

19. The method of claim 15, wherein each of the IoT devices is embedded in an appliance.

20. The method of claim 15, wherein the IoT devices are embedded in one of a refrigerator, a stove, an oven, a coffee maker, a microwave oven, a television, a clothes washer, or a clothes dryer.

* * * * *